United States Patent Office 3,411,018
Patented Nov. 12, 1968

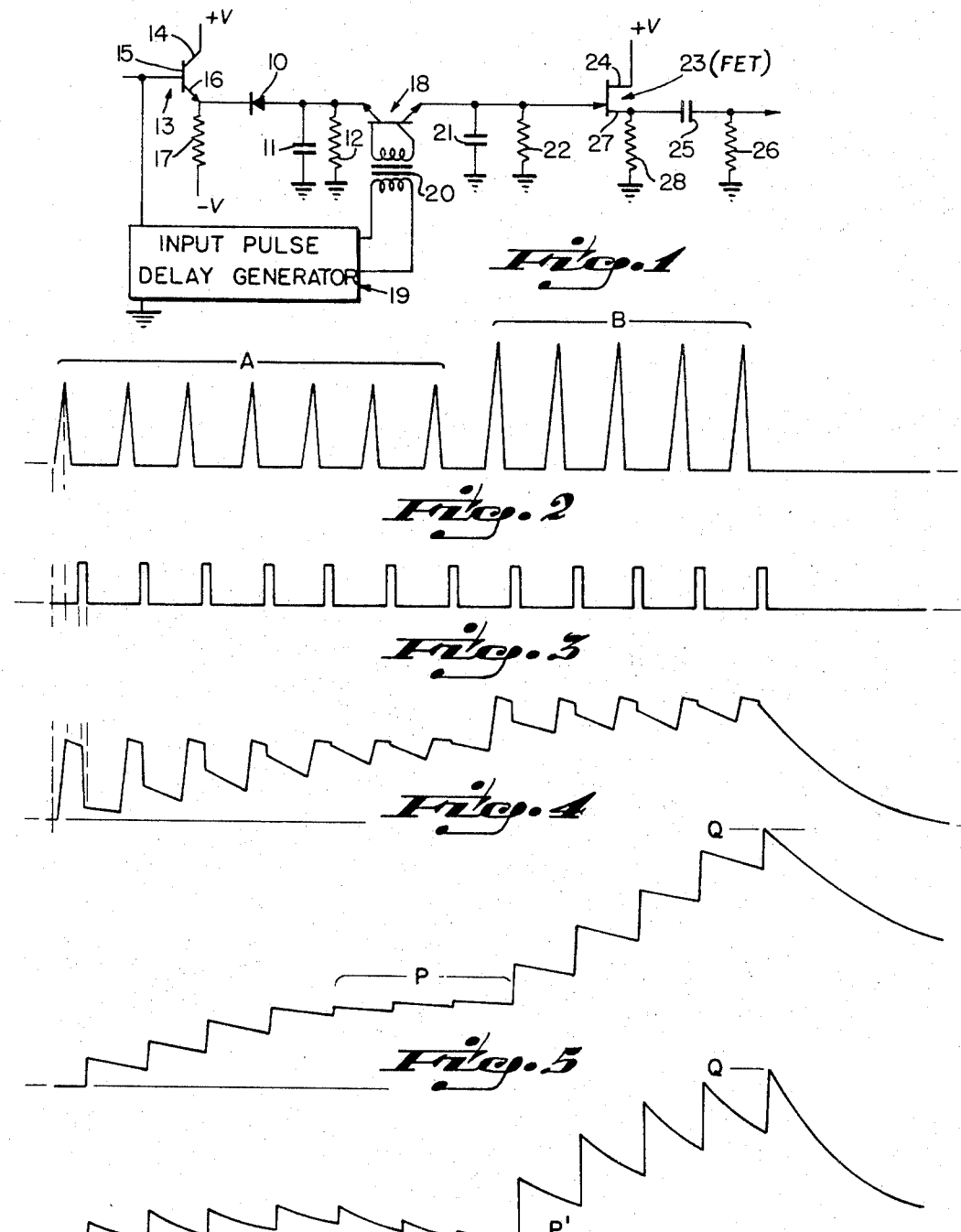

3,411,018
PULSE AMPLITUDE DIFFERENCE
INTEGRATOR
James C. Dapper and Frank L. Wedig, Cincinnati, Ohio,
assignors to Avco Corporation, Cincinnati, Ohio, a corporation of Delaware
Filed Sept. 27, 1965, Ser. No. 490,207
8 Claims. (Cl. 307—235)

ABSTRACT OF THE DISCLOSURE

A circuit for emphasizing pulse amplitude differences comprising a peak detector network including a first capacitor which charges to a voltage level equal substantially to the amplitude of a series of applied and detected input pulses. An integrator network including a second capacitor of larger capacity is coupled to the peak detector network by a transmission gate gated in the rhythm of the input pulses but delayed with respect to the pulses for interchanging energy between the detector and integrator networks. The interchange in energy between the detector network and the integrator network produces a dynamic equilibrium condition at which the peak level dynamically attained by the voltage wave forms across the second capacitor is a measure of the amplitude level of the series of received pulses. A differentiating network comprising a series capacitor and shunt resistor is connected to the integrator network for eliminating the direct current component from the wave forms so that after detection of a series of equal amplitude pulses, the wave forms related to the pulses diminish substantially to zero.

---

The present invention provides an improved circuit which performs the function of emphasizing the distinctions among pulses of different amplitudes. For example, in the wave forms of FIG. 2 herein shown there is a series of seven pulses A of a certain amplitude followed by a series of five pulses B of a different amplitude. There is a recognizable difference between the amplitudes of these two groups of input pulses. The present invention functions in such a manner as to emphasize this difference.

A system in which the invention may be usefully employed generates unidirectional microseconds pulses at a millisecond rate. The desired video pulses may occur simultaneously with high-amplitude similar-shaped background pulses or low-amplitude similar-shaped background pulses or in the presence of noise of lower level than the desired video pulse. The desired pulses may be only fractionally greater than the undesired signals, and the purpose of this invention is to emphasize this ratio many times.

Further application exists in radar or radar-like systems in which a repetitive timing-pulse reference exists.

For a better understanding of the invention, together with other and further objects, advantages, and capabilities thereof, reference is made to the following description of the appended drawings, in which:

FIG. 1 is a circuit schematic of the pulse amplitude difference integrator circuit in accordance with the invention; and FIGS. 2, 3, 4, 5 and 6 are amplitude (as ordinates) time (as abscissae) wave forms showing the wave forms as they appear at the following points in the circuit: input to diode 10, enabling input to gate 18, output of peak detector, output of integrating network, and output of differentiating network, respectively.

In accordance with the invention, the stream of pulses as indicated in FIG. 2 is applied to a peak detector network comprising a diode 10, a relatively small-capacity condenser 11, and a resistance 12. In the embodiment herein shown, the diode, having anode and cathode electrodes, is arranged with its anode connected to the high potential terminals of capacitor 11 and resistor 12, the latter two elements constituting a conventional peak detector network with their low potential terminals connected to a point of reference potential such as ground. The cathode input of the diode 10 is connected to the emitter of a transistor amplifier stage which comprises a common emitter arranged transistor 13 having a suitable reverse-biased collector 14, a base 15, and an emitter 16 connected to the negative terminal of a suitable source of biasing current by an emitter load resistor 17. The transistor here illustratively shown is of type NPN.

It will be understood from the foregoing that a stream of pulses as illustrated in FIG. 2 appears at the emitter output of the amplifier stage and is applied to the peak detector. The output of the peak detector is coupled to a gate circuit generally indicated by the reference numeral 18 and more specifically described hereinafter. This gate circuit is enabled, or keyed into conductivity, by gate pulses which are slightly delayed but otherwise in the rhythm of the input pulses. Specifically, there is provided between the signal input or base 15 and gate 18 an input pulse delay generator and shaping network generally indicated by the reference numeral 19, which has input terminals connected to base 15 and to the grounded point of reference potential, and output terminals connected to the primary of a transformer 20. The gate-enabling pulse output of this transformer, as applied to the transmission gate 18, is as shown in FIG. 3, and it comprises a series of square wave pulses of uniform amplitude, each being slightly delayed with respect to the corresponding input pulse which is keyed for transmission. Parenthetically, the reason for the slight delay is as follows: each input pulse of the type illustrated in FIG. 2 brings the peak detector network to a peak as capacitor 11 receives an increment of charge, and then in the interval between pulses the capacitor 11 slightly discharges. It is desirable to perform the enabling function or gating after the capacitor has sustained the increment of charge but before the charge has leaked off materially through the discharge path provided by resistance 12.

The gate comprises an NPN double-emitter planar silicon type transistor (3N74) having emitters separately connected to the high potential terminals of capacitors 11 and 21, and collector and base electrodes encircuited with the secondary of transformer 20. While this type of switching transistor is offered by the Texas Instrument Company for chopper applications, it is illustrative of the type of switching device of utility here.

Considering now the wave forms at the output of the peak detector—i.e., its high potential terminal—they are as illustrated in FIG. 4. That is to say, the first seven wave forms of FIG. 2, as detected, cause the capacitor 11 to take on successive increments of charge followed by decreasing decrements of charge, the maximum amplitude of the first seven peaks in FIG. 4 being approximately the same. However, in response to the application of the series of pulses B as shown in FIG. 2, capacitor 11 then charges to a new peak, and the last five peaks as illustrated in FIG. 4 are of substantially constant amplitude, signifying detection of the wave forms B in FIG. 2.

Now, further in accordance with the invention, the charge on capacitor 11 is transferred to a larger capacitor 21 by gate 18 at an appropriate time after the input signal pulse occurs, and partially charges this second capacitor 21. A series of these pulse transfers successively produce step charges in the capacitor 21 in an integration form until a stable condition is reached wherein the charge voltage level on the capacitor 21 offsets the peak voltage attained across capacitor 11 by the charge applied to the first capacitor 11 from the most recent pulse. This integrated wave form on the second capacitor 21 is the emphasized signal. Point P in FIG. 5 is the emphasized level of signals A. Point Q is the emphasized level of signals B.

It is reiterated that signal wave forms as illustrated in FIG. 2 are applied as input signals to base 15 and appear at emitter 16 at low impedance referenced to zero volts at the junction of emitter 16 and resistor 17. Diode 10 is polarized to pass these positive going pulses as peak voltage charges on capacitor 11. Each charge on capacitor 11 remains essentially undiminished because of the long time constant discharge path through resistor 12, until such time as the gate 18 is enabled by a pulse from generator 19. This action in capacitor 11 is illustrated by the curves in FIG. 4.

The output of gate 18 is connected to the integrating network comprising a second capacitor 21 and a shunt resistor 22, these elements having their low potential terminals connected to the grounded point of reference potential. As stated above, the function of gate 18 is to cause the charge or energy on capacitor 11 to be transferred to capacitor 21, and each such transfer reduces the charge on capacitor 11 to a residue which is proportional to the charge on capacitor 21 (after the transfer is made) multiplied by a fraction of which the numerator is the capacity of element 11 and the denominator is the capacity of element 21.

As illustrated by the wave forms in FIG. 5, the voltage charge on capacitor 21 steps up every time the charge on capacitor 11 is gated into the integrating network until, parenthetically assuming that the input pulse amplitudes are constant, the charge on capacitor 21 balances the peak value of the voltage on capacitor 11 and equilibrium is reached. For example, the first four wave forms illustrated in FIG. 5 cause capacitor 21 progressively to increase in net retained charge, and the next three wave forms are characterized by the attainment of an equilibrium condition (region P) on capacitor 21. Again, as illustrated by the following five wave forms in FIGS. 2–5, when the amplitude of the received pulses increases (see pulses B, FIG. 2), the stepping up action of the charge on capacitor 21 (FIG. 5) is renewed so as to achieve a higher balance (region Q). Conversely, should there be received at the signal input a series of pulses of lower amplitude than pulses B, charge is transferred the other way—that is, from capacitor 21 to capacitor 11, until a new and lower balance or equilibrium condition is achieved. Therefore it will be seen that the gate 18 is a bilateral gate. The ratio of capacitor 21 to capacitor 11 determines the number of pulses required at the input before equilibrium is established at the integrator network. The wave forms of FIGS. 2 and 4 are roughly drawn to the same scale, while the wave forms of FIGS. 5 and 6 are emphasized in order to illustrate the principles of operation of the invention.

In order to provide a high impedance input, to avoid loading of capacitor 21 by a low impedance output, a field-effect transistor network including transistor 23 is coupled to the integrator network. The output of the integrator network is coupled to the gate input of a field-effect transistor 23 which has one terminal 24 of its drain connected to a suitable source of direct current (not shown), and the other terminal 27 of its source connected to the high potential terminal of a resistor 28 which in turn is coupled to a differentiating network comprising a series capacitor 25 and an output shunt resistor 26. The wave form at the output of the differentiating network is shown in FIG. 6.

A comparison of region P with region Q (FIG. 5) indicates a differential, but the ratio between the levels of those two regions is not materially greater than the ratio between the peaks of pulses A and B. In order greatly to emphasize this ratio, the differentiating network comprising series capacitor 25 and shunt resistor 26 is provided. This network constitutes an AC coupling network out of the integrator. This network permits the execution of the ramp function (FIG. 5) but does not retain a direct-current charge, so that when the equilibrium condition P is reached the wave form settles down close to the zero axis, as indicated at P' in FIG. 6. Now then, a comparison of region P' with region Q—i.e., a dynamic comparison (FIG. 6)—indicates a very high ratio and an emphasis approaching infinity. In practice the time constant of elements 25 and 26 is several times the duration of an expected series of pulses such as B.

It will be noted that three constant networks are here utilized. The time constant of the peak detector network 11, 12 is chosen to be sufficiently long essentially to preserve the peak amplitude of the input signal until the charge transfer or gating action occurs, but short enough to discharge capacitor 11 sufficiently to accept sequential pulses of lower amplitude should they occur. The time constant of the network comprising capacitor 21 and resistor 22 is chosen to be long enough to preserve the integration rise for the maximum increased amplitude pulses to be expected, but short enough to discharge after a sequence of such pulses in order to follow subsequent events, such as a sequence of lower amplitude pulses. The time constant of the network comprising the elements 25 and 26 is chosen to be sufficiently long to preserve the fast portion of the integration ramp, but sufficiently short to suppress the longer direct current ramp slope.

In the foregoing description of FIGS. 2, 4, 5 and 6, the described operation was based on the premise that a series of pulses A was followed by a series of pulses B of higher amplitude. As illustrated in FIG. 5, the peak voltage level attained across the integrator network 21, 22, as indicated by region P, was a measure of the amplitude of these pulses. Now, when the series of pulses of larger amplitude—i.e., pulses B—are received, that level increases to level Q as shown in FIG. 5. Now in order to emphasize the difference between these two levels, the invention operates in such a way that, at the output of the differentiating network, the continuance of a series of pulses such as A permits the wave form substantially to decrease to zero as shown at P' in FIG. 6. The purpose of this is to emphasize the attainment of the voltage amplitude peak Q in response to the pulses B. In other words, Q as shown in FIG. 6 represents a dynamic condition, and the difference between P' and Q in FIG. 6 is a greatly emphasized indication of the difference between the levels of pulses A and B in FIG. 2.

The foregoing description, as indicated above, postulates a series of pulses A followed by a series of pulses of higher amplitude B. Had the pulses B been of lesser amplitude than the pulses A, the ramp between regions P and Q in FIG. 5 and between regions P' and Q in FIG. 6 would have been in the opposite direction—i.e., a descent rather than an ascent.

In one successfully operating embodiment of the invention the following parameters were found to be acceptable:

| | | |
|---|---|---|
| Transistor 13 | type | 2N910 |
| Transistor 18 | do | 3N74 |
| Transistor 23 | do | FE200 |
| Diode 10 | do | 1N483B |
| Resistor 17 | ohms | 10,000 |
| Resistor 12 | megohms | 3.3 |
| Resistor 22 | do | 22 |
| Resistor 28 | ohms | 27,000 |
| Resistor 26 | do | 220,000 |
| Bias on collector 14 of transistor 13 | volts | +18 |
| Bias on emitter 16 of transistor 13 | do | −18 |
| Bias on drain connection 24 of transistor 23 | do | +18 |
| Capacitance of capacitor 11 | microfarad | .004 |
| Capacitance of capacitor 21 | do | .01 |
| Capacitance of capacitor 25 | do | 1 |

While there has been shown and described what is presently considered to be the preferred embodiment of the invention, it will be understood by those skilled in the art that various modifications and changes may be made therein without departing from the true scope of the invention as defined by the appended claims. For example, an operational amplifier with capacity and voltage feedback could be employed in lieu of the integrator network 21, 22.

We claim:

1. A combination of electronic components for emphasizing the amplitude difference between a series of pulses of one amplitude level and a series of pulses of another amplitude level, comprising:

a peak detector network including a first energy storage device which charges to a voltage level equal substantially to the amplitude of a series of applied and detected pulses;

an integrator network including a second energy storage device of larger capacity;

means gated in the rhythm of the applied pulses but delayed with respect to said pulses for interchanging energy between said detector network and said integrator network, energy passing from the detector network to the integrator network when the voltage level to which the integrator network is charged is less than that to which the peak detector network is charged, and energy passing from the integrator network to the peak detector network in the event that the peak detector network is charged to a lesser voltage than the integrator network;

whereby the interchange of energy terminates in a dynamic equilibrium condition at which the peak level dynamically attained by the voltage wave forms across the second energy storage device is a measure of the amplitude level of a series of received pulses;

and differentiating means for eliminating the direct current component from said wave forms, whereby, after detection of pulses of the same amplitude for a substantial period of time, the wave forms related to said pulses diminish substantially to zero.

2. The combination in accordance with claim 1 in which the gated means is a bilateral transistor switch.

3. The combination in accordance with claim 2 in which the switch is a double-emitter planar type transistor.

4. The combination in accordance with claim 3 in which the peak detector network has an input and in which the gating of the switch is provided by an input pulse delay generator coupled between said input and the enabling circuit of the switching transistor.

5. The combination in accordance with claim 4 in which a field-effect transistor impedance transforming stage is coupled between the integrator network and the differentiating means.

6. The combination in accordance with claim 5 in which the peak detector network includes a resistor which together with the first energy storage device has a time constant sufficiently long to preserve the peak amplitude of an input pulse until the gating action occurs, but short enough to permit the detection of sequential pulses of lower amplitude should they occur.

7. The combination in accordance with claim 6 in which the integrator network includes a resistor which together with the second energy storage device has a time constant sufficiently long to preserve the integration rise for the maximum increased-amplitude pulses to be handled, but short enough to discharge after a sequence of such pulses.

8. The combination in accordance with claim 7 in which the differentiating means includes a resistor and a third energy storage device which together have a time constant sufficiently long to preserve the dynamic portion of the integration ramp, but sufficiently short to suppress the longer direct current component.

No references cited.

ARTHUR GAUSS, *Primary Examiner.*

J. D. FREW, *Assistant Examiner.*